United States Patent [19]

Komeyama

[11] Patent Number: 4,893,962
[45] Date of Patent: Jan. 16, 1990

[54] COUPLING
[75] Inventor: Nobuo Komeyama, Osaka, Japan
[73] Assignee: Koyo Seiko Co., Ltd., Osaka, Japan
[21] Appl. No.: 301,942
[22] Filed: Jan. 26, 1989
[30] Foreign Application Priority Data Jan. 27, 1988 [JP]   Japan .............................. 63-9082[U]

[51] Int. Cl.[4] ............................................. B25G 3/00
[52] U.S. Cl. .................................... 403/288; 403/337;
403/355; 464/130
[58] Field of Search ............... 403/356, 358, 337, 355,
403/288, 24; 464/117, 128, 130, 131, 133, 136

[56] References Cited

U.S. PATENT DOCUMENTS 2,585,113  2/1952  Gredell ............................ 403/337 X
3,138,032  6/1964  Raso et al. ....................... 403/356 X
4,090,796  5/1978  Okuda et al. ......................... 403/24

FOREIGN PATENT DOCUMENTS 1192885  5/1965  Fed. Rep. of Germany ...... 403/358

Primary Examiner—Andrew V. Kundrat
Attorney, Agent, or Firm—Wenderoth, Lind & Ponack

[57] ABSTRACT

A coupling which transfers torque from one shaft to another through a fitting portion of a key and a keyway. Seal members are provided in gaps which are formed between opposite surfaces of the key and keyway and which do not transfer torque, so as to prevent entry of water into the gaps without bearing pressure due to the torque.

5 Claims, 7 Drawing Sheets

COUPLING

BACKGROUND OF THE INVENTION

This invention relates to a coupling which transfers a torque from one shaft to another via a keykeyway fit portion having a watertight seal.

As an example of a coupling to transfer torque between two shafts, a cross-type universal coupling shown in FIG. 3 is usually known. In this universal coupling, each of four columns 32 (only one is shown in the figure) of a cross 31 which is a rigid body of cross shape is equipped with needle rollers 33, a thrust washer 34 above such rollers, and an oil seal 35 below such rollers. Each of bearing cases 36 (36r, 36l, 36o, 36u) is rotatably installed on each of the above columns 32 via the needle rollers 33 with a bolt 37. A yoke 38 fixed on an end of a shaft which is not shown in the figure is connected to the bearing cases 36l and 36r on the left and the right by four bolts 39 in such a manner that a keyway 38a and a key 36a, which are formed on their connecting surfaces in the radial direction, will fit together. The upper and lower bearing cases 36o and 36u are similarly connected to another yoke fixed on an end of the other shaft, which is not shown in the figure, with four bolts. Rotation is transferred from one shaft to the other one which crosses the former.

The above bearing cases 36 are each rotatably installed on the columns 32 of the cross via the needle rollers 33 as shown in FIG. 4. The keys 36a are inserted into the respective keyways 38a and the bearing cases 36 are fixed to the yoke 38 by the bolts 39 as shown in FIG. 5. Close fit and transition fit cannot be adopted for the fitting of the key 36a and keyway 38a because of restrictions in the mounting of this universal coupling on the shafts. Therefore, clearance fit is adopted, which results in tiny gaps between torque-transfer contacting surfaces between the key 36a and keyway 38a and between axially opposing surfaces 41 of the same as shown in FIG. 5.

Thus, with the conventional universal coupling mentioned above, the keyways 38a and the keys 36a, which transfer the torque between the yoke 38 which is connected with one of the shafts and the bearing cases 36 which are connected with the other shaft, are clearance-fit as shown in FIG. 6, a detailed view. Therefore, water enters from outside, as shown by the arrows, via the axial gap 42, side grooves 43 and 43 provided on the both sides of the key 36a, and an end 44 of the keyway toward the center of the yoke (See FIG. 3). Such water enters respective tiny gaps between the keys and keyways and will not easily drain. As a result, corrosion and wear are caused by such water in the clearance of the key-keyway fit portions. Consequently, the keys 36a and the keyways 38 will be damaged by corrosion cracking and wear.

SUMMARY OF THE INVENTION

The object of this invention is to provide a coupling which can be used safely for a long period of time by minimizing corrosion and wear of the keys and the keyways by preventing entry of water into a key-keyway fit portion.

To achieve the above object, the present invention provides a coupling which transfers torque of one shaft to another shaft through a fitting portion of a key and a keyway when the one shaft is rotating, and the coupling is characterized in that seal members are provided in gaps which are formed between opposite surfaces of the key and keyway and do not transfer the torque, so as to prevent entry of water into the gaps without receiving a pressure due to the torque.

As shown in FIGS. 2 (a), (b), and (c) by way of example, a coupling according to the present invention has flanges 13 and 14 which are fixed to opposite ends of a pair of shafts 11 and 12 and connected to each other by bolts 15, a keyway 17 provided in a diametric direction on contacting surfaces of the flanges, and a rectangular key 18 which is inserted into the keyway. Gaps between chamfered portions 21 on the four corners of the key 18 and radius portions 20 on the four corners of the keyway 17 do not transfer a torque. If sealing members 22 having a bow shape cross section are attached on the chamfered portions of the four corners, entry of water into the gaps can be prevented by such sealing members. Since the above sealing members 22 are installed in gaps which do not transfer torque in the area of key fitting, the fitting portion of the key 18 and the keyway 17 will neither be corroded by entry of water nor damaged by corrosion wear without the sealing members 22 being damaged as they do not receive the excessive pressure based on the torque. Thus, this flanged coupling can be used for a long period of time without failure.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 (b) is a cross section taken on line b—b of FIG. 1 (a);

FIG. 1 (c) is a cross section taken on line c—c of FIG. 1 (b);

FIG. 2 (c) is a detailed view of a sealing portion of the above second embodiment;

DETAILED DESCRIPTION OF PREFERRED EMBODIMENTS

Figure 1B:
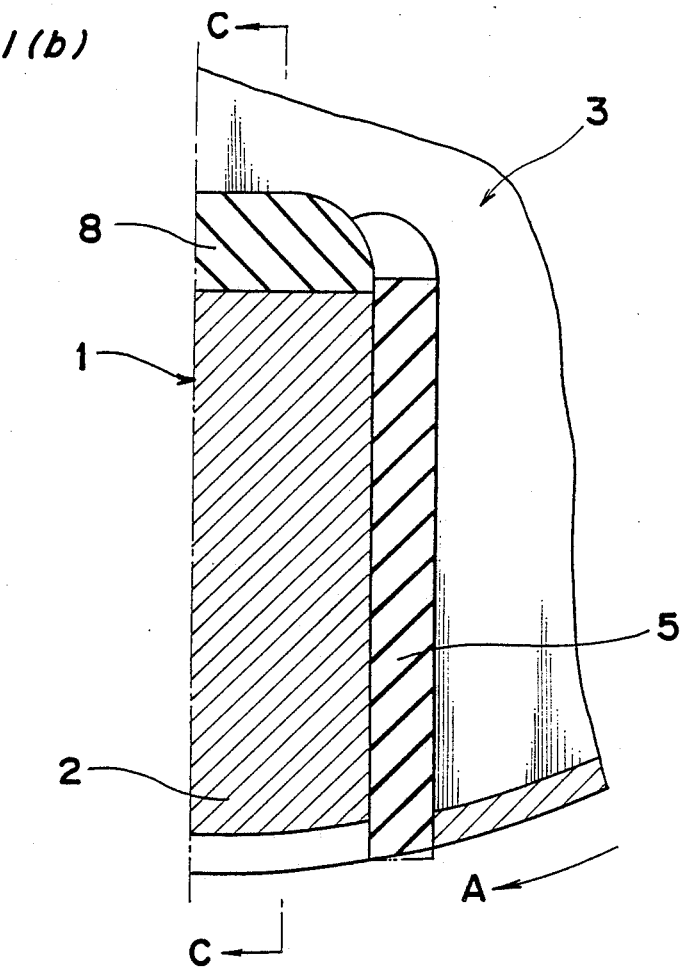
FIG. 1 (a) shows a key fitted portion of a bearing case and yoke of a cross-type universal coupling of a first embodiment of this invention.
Figure 1A:
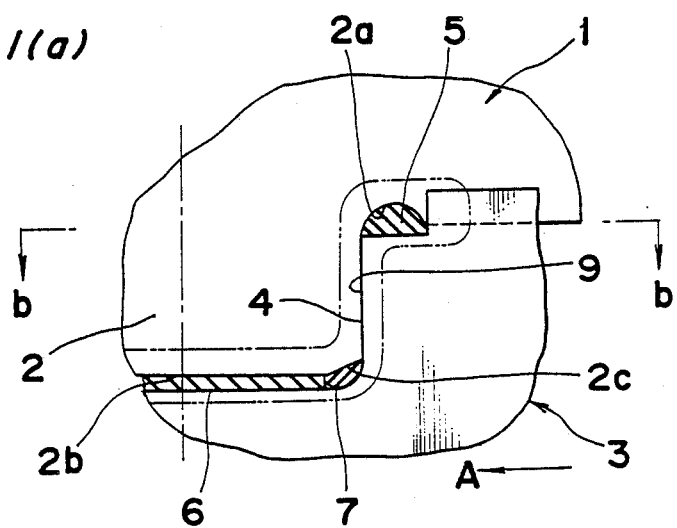
Figure 1C:
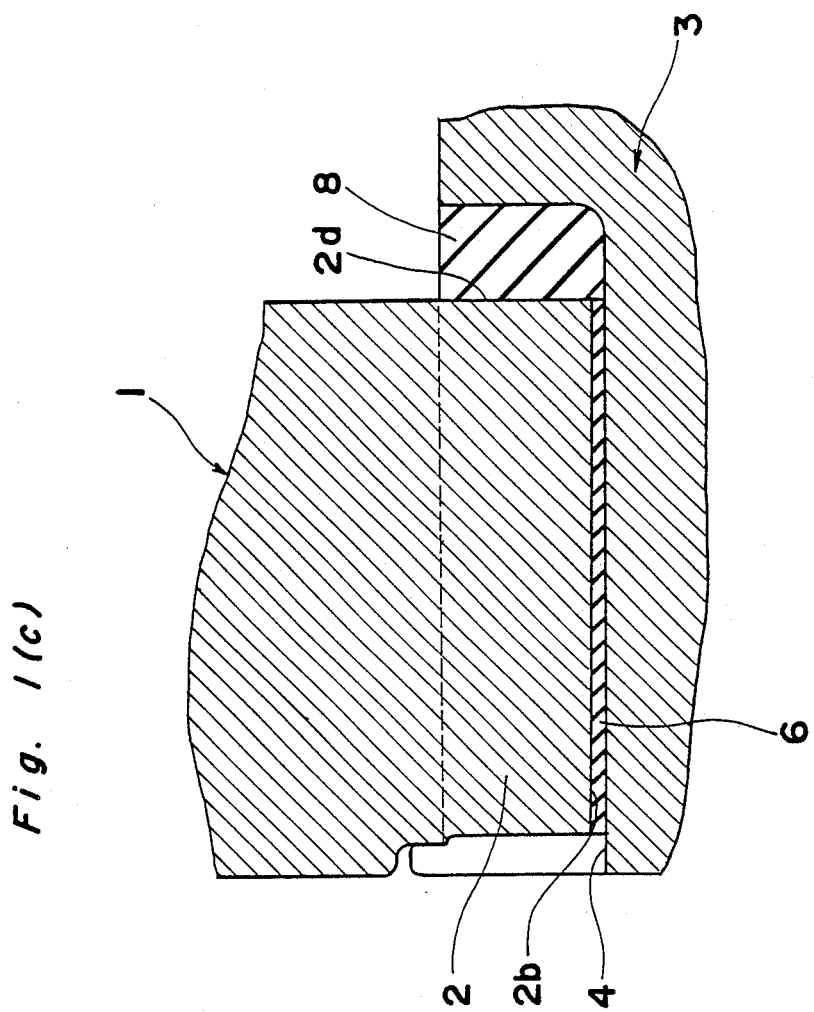
Figure 6:
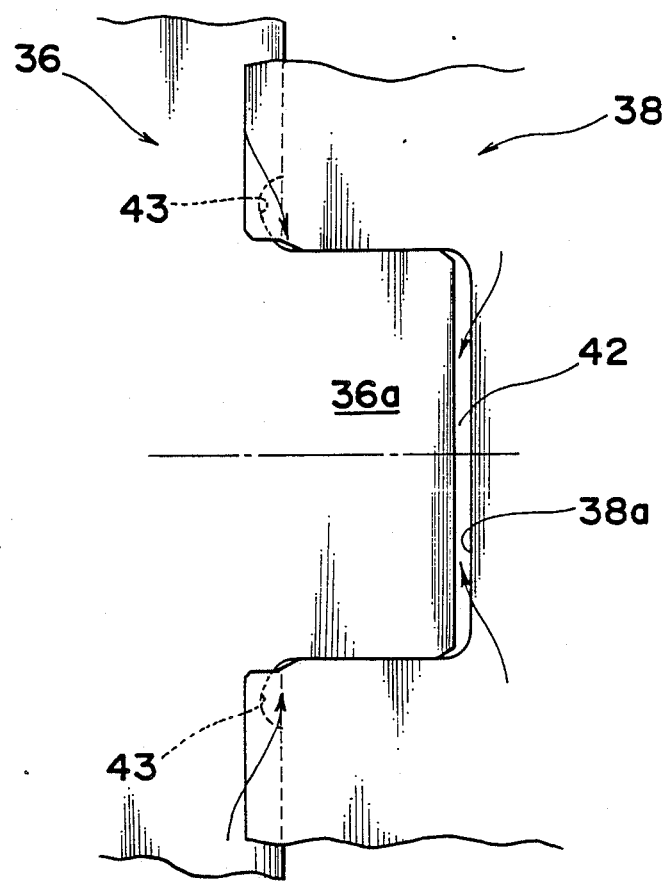
FIG. 6 is a detailed view of a key fitted section of the prior art cross-type universal coupling.

FIGS. 1 (a), (b), and (c) show a first embodiment of this invention. FIG. 1 (a) shows, similarly to FIG. 6, an appearance of a key-keyway fit portion of a bearing case and a yoke of a cross-type universal coupling similar to the one shown in FIG. 3. FIGS. 1 (b) and (c) are different cross-sections of FIG. 1(a) showing the key-keyway fit portion. The numeral 2 represents a key which protrudes at the center of a connecting surface of a bearing case 1. The numeral 4 represents a keyway which is radially formed on a connecting surface of a yoke 3 so as to receive the key 2 with clearance. The numeral 5 is a gasket attached into a side groove 2a of semicircular cross-section on either side of a base portion of the above key 2 so as to seal a gap. The numerals 6 and 7 represent gaskets attached respectively to a front surface 2b of the above key 2 and chamfered edges 2c on both sides so as to seal gaps. The numeral 8 indicates a further gasket attached to an interior surface of the key 2 so as to seal a gap.

The above gaskets 5-8 are made of acrylonitrilebutadiene rubber to serve as sealing members which prevent water from entering the keyway 4. The gaskets 5, 6, and 7 in FIG. 1 (a) and 8 in FIG. 1 (b) are shown with hatching for convenience, although they are not cut away.

Figure 3:
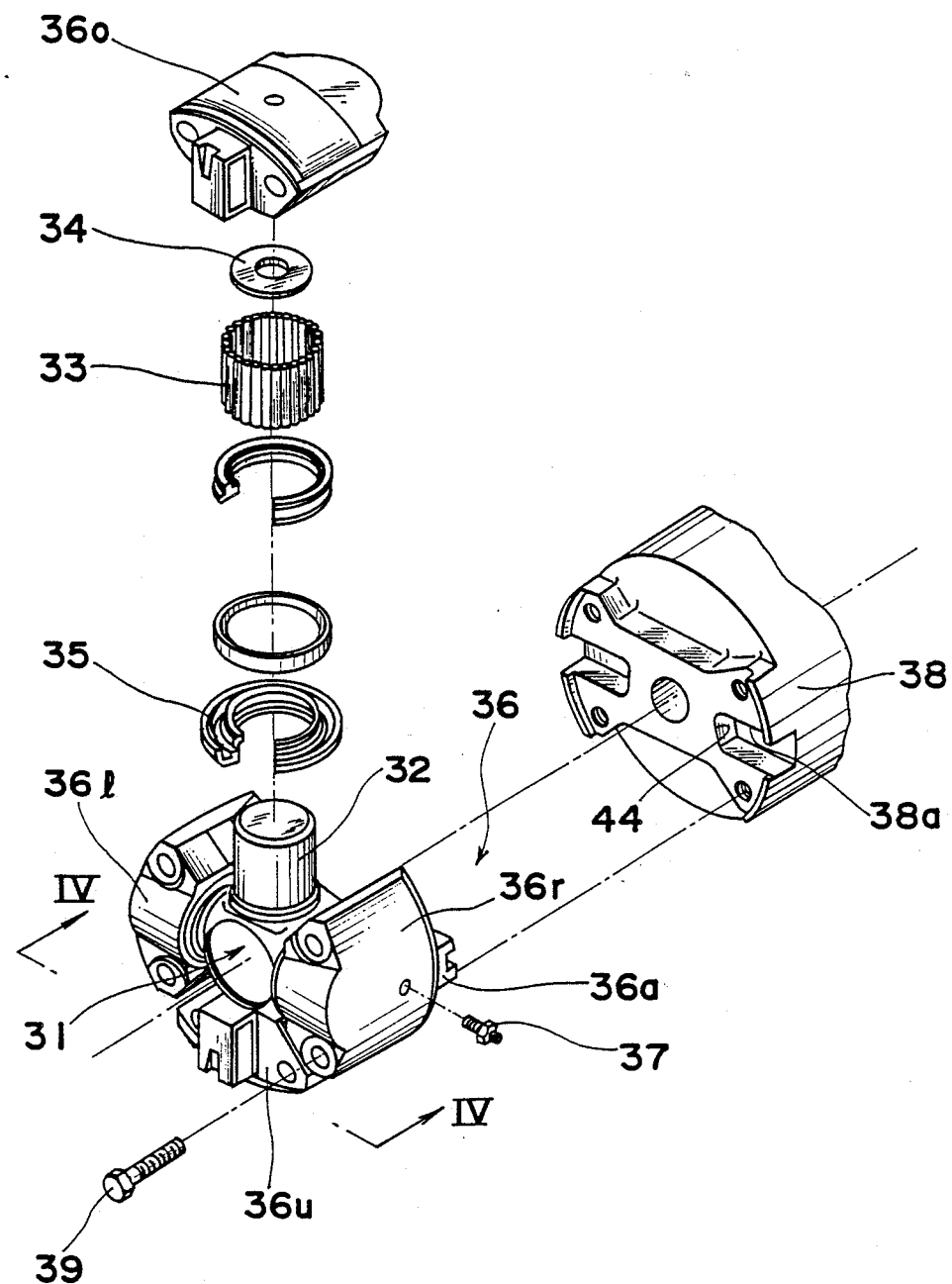
FIG. 3 is an exploded view of a prior art cross-type universal coupling.
Figure 4:
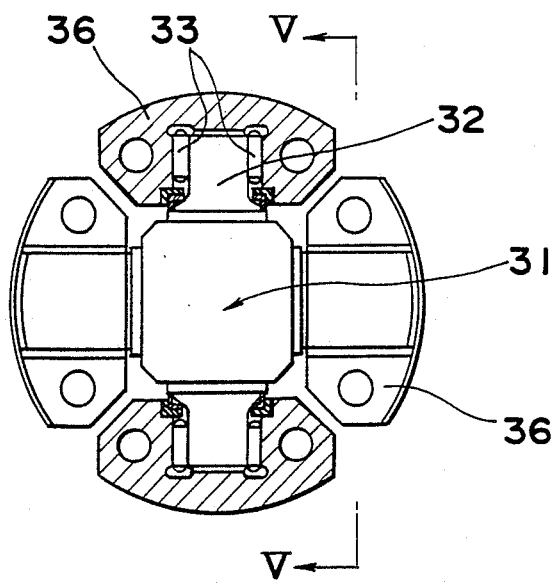
FIG. 4 is a perspective view taken on line IV—IV of FIG. 3.
Figure 5:
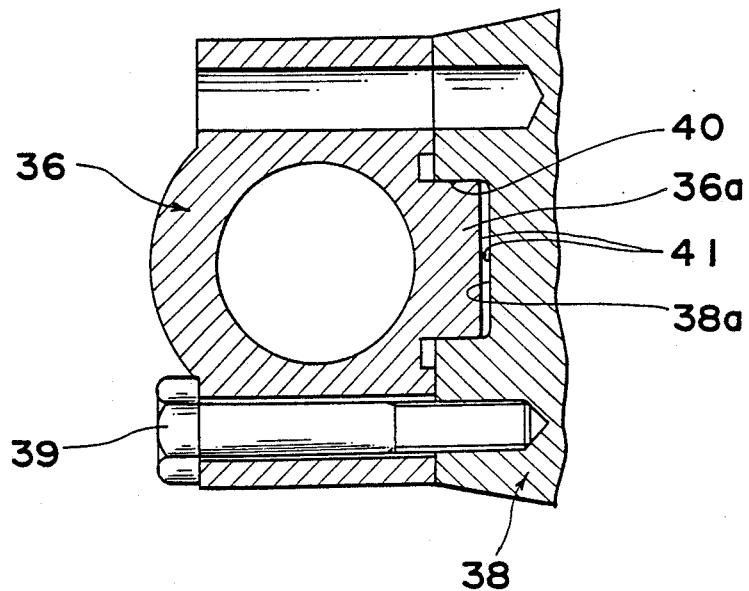
FIG. 5 is a cross section taken on line V—V of FIG. 4.

After the universal coupling is assembled by fixing by bolts (for example, see FIG. 3, numeral 39) the yoke 3, which is fixed to one of the shaft ends (not shown in the figure), to a pair of bearing cases 1 which are connected to another shaft (not shown in the figure) via a cross, another pair of bearing cases and another yoke (see FIG. 3). A sealing bonding adhesive is applied to a gasket sealing portion enclosed with a two-dot chain line in FIG. 1 (a) and the contacting portion 9 of the key and the keyway so as to completely stop the entry of water from outside, and the tip of the gasket 5 which protrudes, shown with a two-dot chain line in FIG. 1 (b), is cut off.

The action of the universal coupling having the above-mentioned structure is as follows:

The rotation of the one shaft makes the yoke 3 rotate in the direction shown by an arrow A in FIGS. 1(a) and (b). The torque is transferred to the bearing case 1 via the contacting portion 9 of the key and keyway, and rotates the other shaft which is connected to the bearing case 1. Therefore, the gaskets 5 through 8, which seal the gaps which are not in the contacting portions 9 of the key and keyway and do not directly transfer the torque, are not broken by excessive pressure caused by the torque. These gaskets effectively prevent entry of water from outside, jointly with the above-mentioned sealing bonding adhesive. As a result, the fitting portion of the key 2 and keyway 4 will neither be corroded by entry of water nor damaged by corrosion cracking or corrosion wear. Thus, this universal coupling can be used for a long period of time without failure.

Figure 2A:
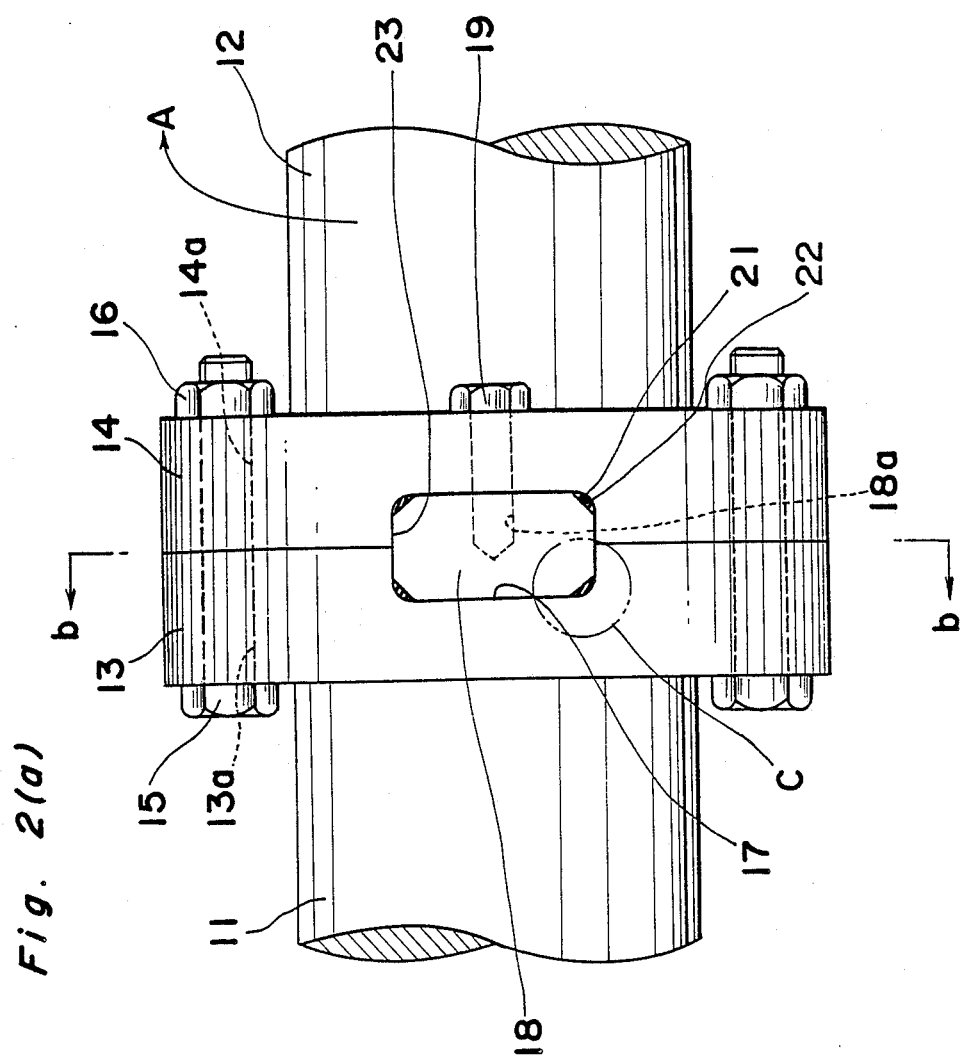
FIGS. 2 (a) and (b) are a side view and front view of a flanged coupling of a second embodiment of this invention.
Figure 2B:
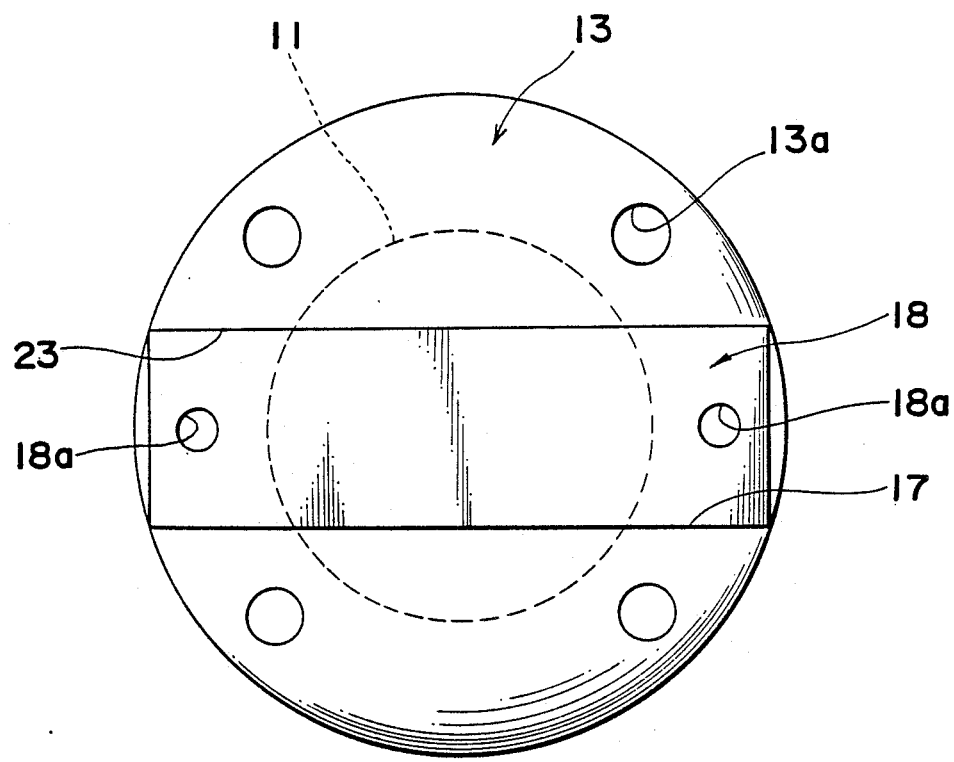
Figure 2C:
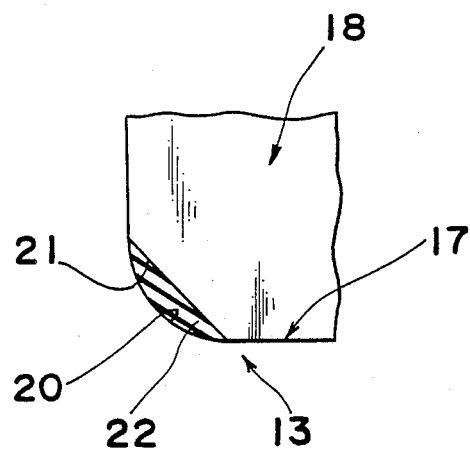

FIGS. 2 (a) and (b) are a side-view and front-view of a flanged coupling, which is a second embodiment of this invention and FIG. 2(c) is a view of a seal portion of the flanged coupling. In this second embodiment, flanges 13 and 14 are fixed on opposing ends of shafts 11 and 12, which are arranged in a line. Both flanges are connected by bolts 15, each of which penetrates through holes 13a and 14a and is threaded onto a nut 16. The contacting surfaces of the above flanges 13 and 14 are respectively cut in a diametric direction to a predetermined width and depth to form a keyway 17. A key 18 having a rectangular cross-section is inserted into this keyway 17. This key 18 is fixed to the keyway 17 by bolts 19 mounted from the side of the flange 14 through holes 18a and 18a.

In each of the four corners of the above keyway 17, a radial portion 20 is formed as shown in FIG. 2 (c). In addition, a chamfered portion 21 is formed at each of the four corners of the key 18. A gasket 22 of a bow shape, made of acrylonitrile-butadiene rubber, is attached to each chamfered portion to prevent water from entering the keyway 17.

In this second embodiment, when one shaft 12 rotates in the direction shown by an arrow A in FIGS. 2(a) and (b), the torque is transferred to the flange 13 via the contacting portion 23 of the key and keyway shown in FIG. 2 (b) and rotates the other shaft 11. Therefore, the gaskets 22, which seal the gaps in the four corners of the keyway where the torque is not directly transferred, are not broken by excessive pressure caused by the torque and effectively prevent entry of water from outside. As a result, the fitting portion of the key 18 and keyway 17 will neither be corroded by entry of water nor damaged by corrosion cracking or corrosion wear. Thus, this flanged coupling can be used for a long period of time without failure.

The invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

What is claimed is:

1. A coupling, comprising:
   a pair of connecting members adapted to be fixed to associated ends of two shafts to be coupled together;
   a keyway in each of said connecting members in the side of each said connecting member substantially facing the other said connecting member, each of said keyways having at least one side wall;
   key means disposed between said connecting members and received in said keyways, said key means having side faces abutting associated ones of said side walls of said keyways for transferring torque, said key means and said keyways having spaced substantially facing portions which do not transfer torque and which define gaps within said keyways; and
   watertight seal means within said gaps.

2. A coupling as in claim 1, wherein said connecting members are yokes having two of said keyways each, and said key means includes; a cross member having four substantially uniformly spaced radial arms, bearing means disposed on each of said arms, a bearing case housing each of said bearing means, and a key portion extending from each of said bearing cases and received in associated ones of said keyways, said key portions having said side faces and defining said gaps with said associated keyways.

3. A coupling as in claim 1, wherein said connecting members are flanges, said flanges being in opposed relation with said keyways substantially aligned.

4. A coupling as in claim 1, wherein said seal means is acrylonitrilebutadiene rubber.

5. A coupling as in claim 1, further comprising sealing bonding adhesive applied to said portions.

* * * * *